United States Patent [19]
Bianchi et al.

[11] 4,101,177
[45] Jul. 18, 1978

[54] IDLER WEAR STRIP RETAINER FOR TRACK-TYPE VEHICLES

[75] Inventors: Raymond A. Bianchi, Pekin; Harry E. Campen, Peoria, both of Ill.

[73] Assignee: Caterpillar Tractor Co., Peoria, Ill.

[21] Appl. No.: 802,611

[22] Filed: Jun. 2, 1977

[51] Int. Cl.² .......................................... B62D 55/10
[52] U.S. Cl. ................................................ 305/31
[58] Field of Search ............................ 305/10, 31, 32

[56] References Cited
U.S. PATENT DOCUMENTS
3,779,615  12/1973  Kennicutt et al. ............. 305/10 X Primary Examiner—Robert B. Reeves
Assistant Examiner—John P. Shannon
Attorney, Agent, or Firm—James R. Bell

[57] ABSTRACT

An idler wear strip retainer for track-type vehicles includes a plurality of retainer members secured to a frame portion of an associated vehicle for relasably retaining the wear strip in position relative to the idler.

2 Claims, 8 Drawing Figures

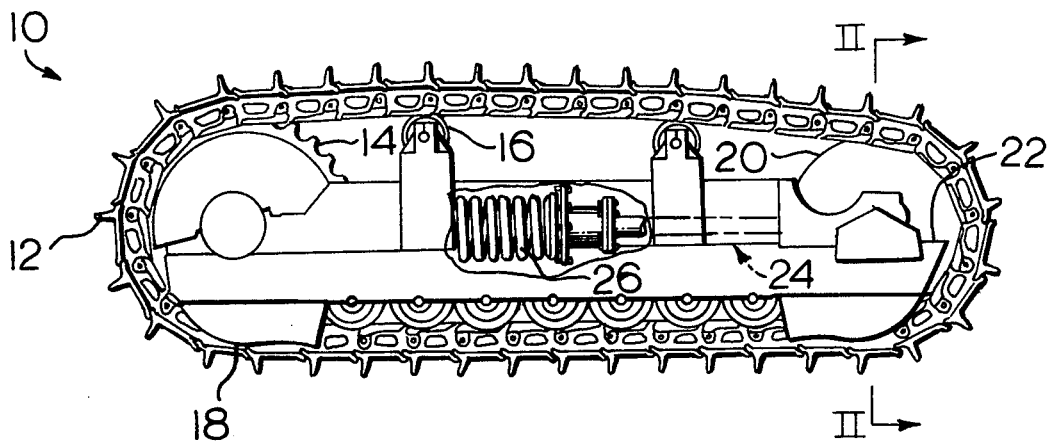
Fig_1_
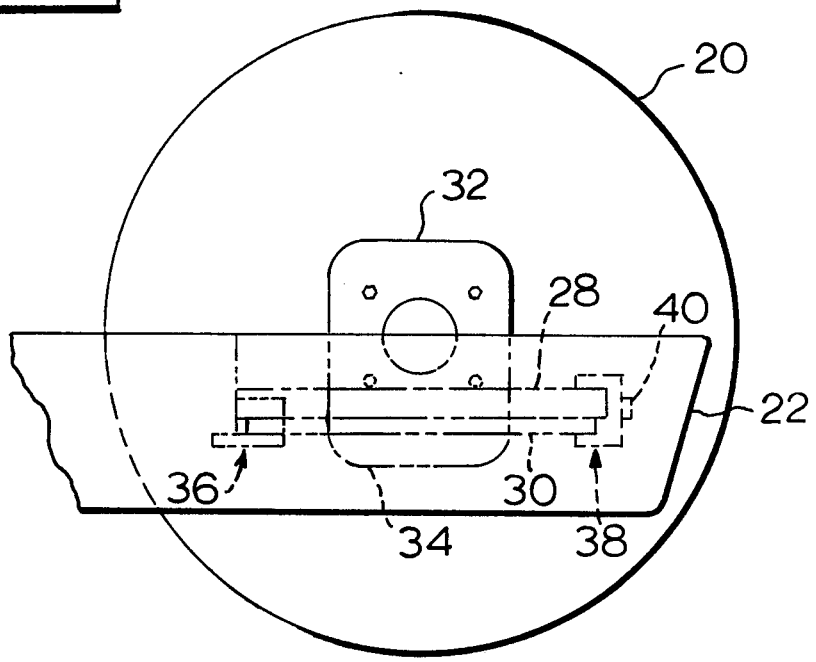
Fig_3_

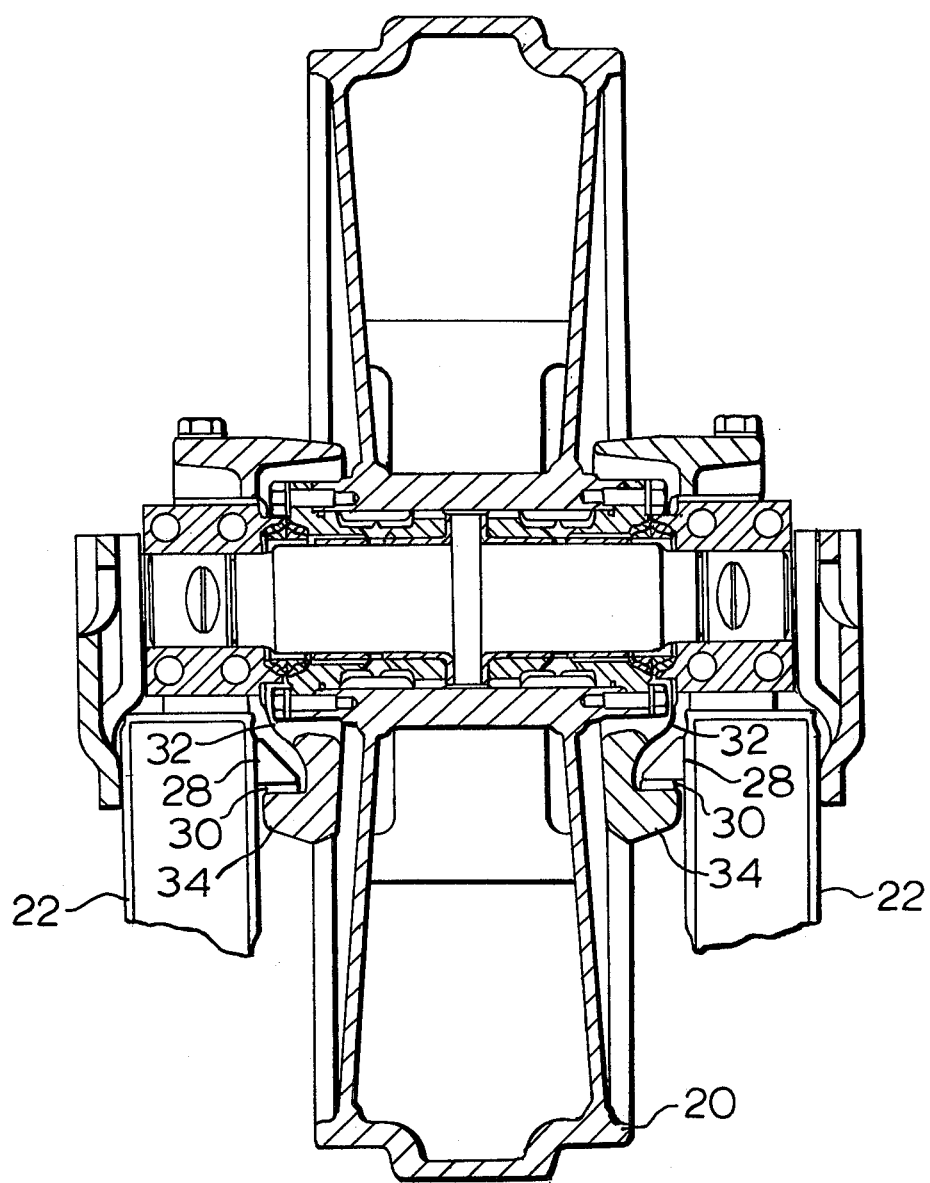
Fig_2_

IDLER WEAR STRIP RETAINER FOR TRACK-TYPE VEHICLES

BACKGROUND OF THE INVENTION

1. Field of the Invention:

This invention relates generally to land vehicles and more particularly to those having wheel substitutes.

2. Description of the Prior Art:

Track-type vehicles generally include an idler wheel for supporting a moving track. Support flanges extend from opposite sides of the idler. A recoil mechanism, usually including a large compressible coil spring, is mounted on the vehicle and is also connected to the idler wheel. When the track is flexed substantially, the idler wheel moves to compress the coil and absorbs the track flexure.

A roller frame is also connected to the vehicle and extends on opposite sides of the idler for supporting the idler. Wear strip supports are connected to the frame and metallic wear strips are usually welded to those supports. During track flexure, the support flanges on the idler engage the wear strips on the frame in metal to metal sliding and supporting engagement.

Due to repeated metal to metal wear, the strips require occasional removal and replacement. Such removal is difficult and time consuming since the wear strips are welded in place on the frame.

In view of the above, it would be advantageous to provide a wear strip retained in wear position relative to the idler and quickly and easily inserted and removed from the vehicle which overcomes the problems associated with the prior art.

SUMMARY OF THE INVENTION

The present invention is directed to overcoming one or more of the problems as set forth above.

According to the present invention this is accomplished by providing retainer members secured to a frame portion of a retainer vehicle for releasably retaining the wear strip in position relative to the idler. At least one of the retainer members is releasably secured to the frame portion.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a view generally illustrating a track-type tractor and its associated track undercarriage;

FIG. 2 is a cross-sectional view illustrating a roller frame-idler wheel portion of a track undercarriage taken along the line II—II of FIG. 1;

FIG. 3 is a partial side view illustrating supportive engagement between a roller frame and an idler wheel;

FIG. 8 is an isometric view illustrating the wear strip and retainer of this invention.

BRIEF DESCRIPTION OF THE PREFERRED EMBODIMENT

Figure 4:
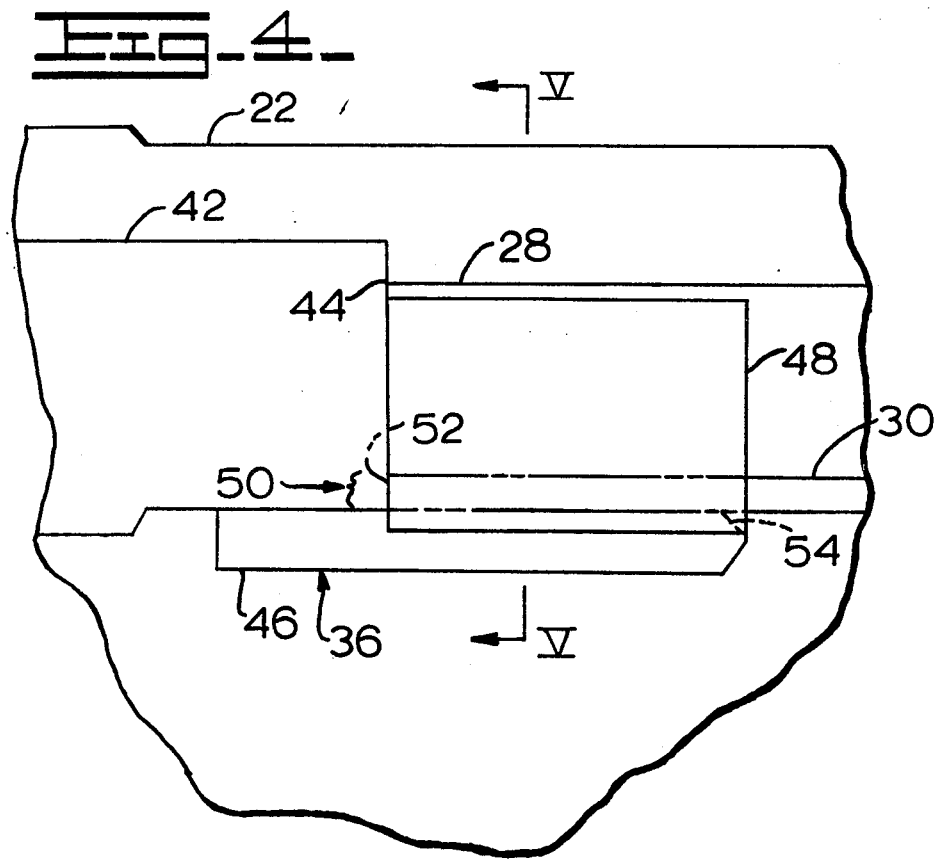
FIG. 4 is a side view illustrating one end of the wear strip and retainer of this invention.

Referring now to the drawings, a track-type tractor is generally designated 10 in FIG. 1 and includes an undercarriage comprising a track 12 driven by sprocket 14 and supported by carrier rollers 16, track guides 18 and idler wheel 20. A roller frame 22 is connected to the main frame of the tractor and aids in supporting the sprocket and idler wheels. A resilient recoil mechanism, shown in phantom outline at 24, includes a large compressible coil spring 26 and is mounted on the tractor frame and connected to idler 20 to permit idler 20 to move relative to its supporting roller frame 22 when track 12 is substantially flexed as is well known. When such flexure of the track occurs, idler wheel 20 supported by frame 22 moves relative to the frame toward sprocket 14 thus compressing coil 26 which absorbs the track flexure.

In FIG. 2, opposed roller frame members 22 are spaced to support idler wheel 20. Wear strip supports 28 are connected, usually by welding, to the frame members 22. Metallic wear strips 30 are also connected, usually welded, to the wear strip supports 28. A metallic idler collar 32, mounted on opposite sides of idler wheel 20 engages wear strips 30 in metal to metal sliding and supporting engagement where support flange 34 of collar 32 engages wear strip 30, see also FIG. 3.

Further in FIG. 3, roller frame 22 including wear strip support 28 has a plurality of retainer members 36,38 secured thereto for releasably retaining wear strip 30 in position relative to idler 20. At least one of the retainer members, such as that shown at 38, is releasably connected to the frame 22 via support 28 due to attachment with a bolt 40.

Figure 5:
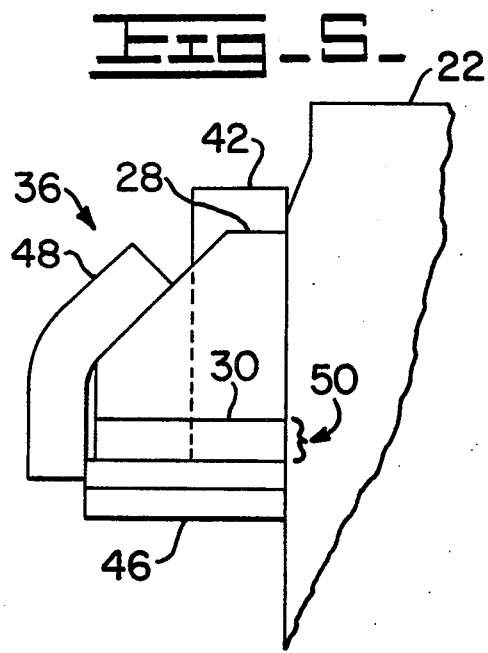
FIG. 5 is an end view illustrating the wear strip and retainer of this invention taken along line IV—IV of FIG. 4.

First retainer 36, FIGS. 4 and 5, includes a wear strip stop 42 preferably steel and welded to and part of frame 22. Stop 42 abuts the first end 44 of wear strip support 28. Retainer 36 also includes a wear strip bottom retainer 46 preferably steel and welded to stop 42 and extends therefrom a preselected distance substantially parallel with support 28. Also wear strip retainer 36 includes side retainer 48 preferably of steel and welded to support 28 and to bottom retainer 46. Thus, first retainer 36 forms a receptacle at slot 50 with frame 22 for slidably receiving first end 52 of wear strip 30 whereby first end 52 of wear strip 30 is releasably engaged and retained by first retainer 36. A chamfer 54 is preferably formed on bottom retainer 46 to provide easy inserting of first end 52 of strip 30 into slot 50.

Figure 6:
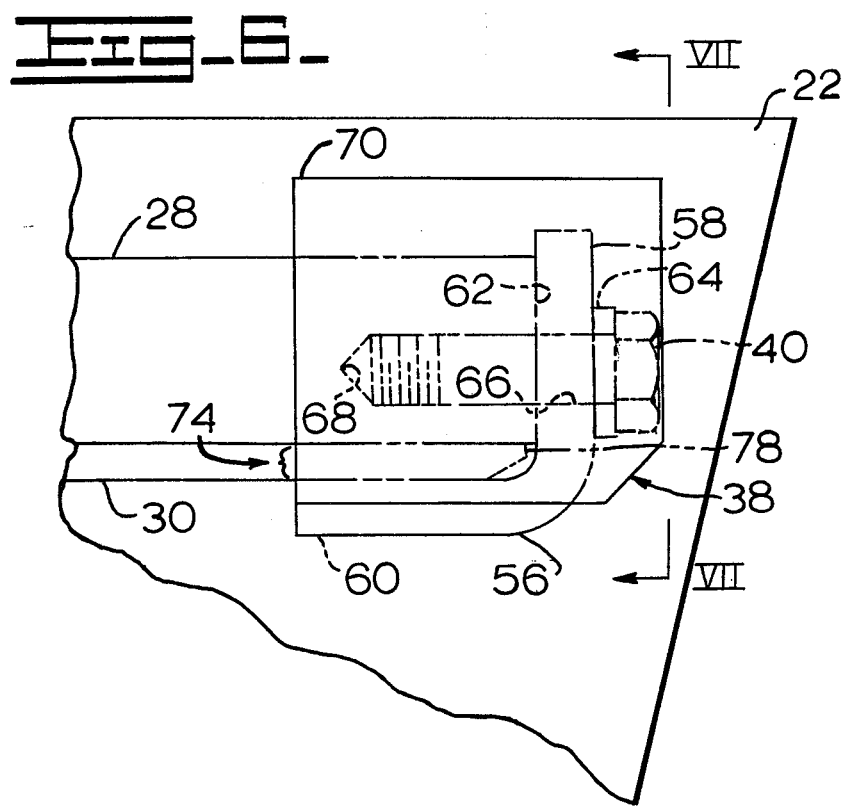
FIG. 6 is a side view illustrating the other end of the wear strip and retainer of this invention.
Figure 7:
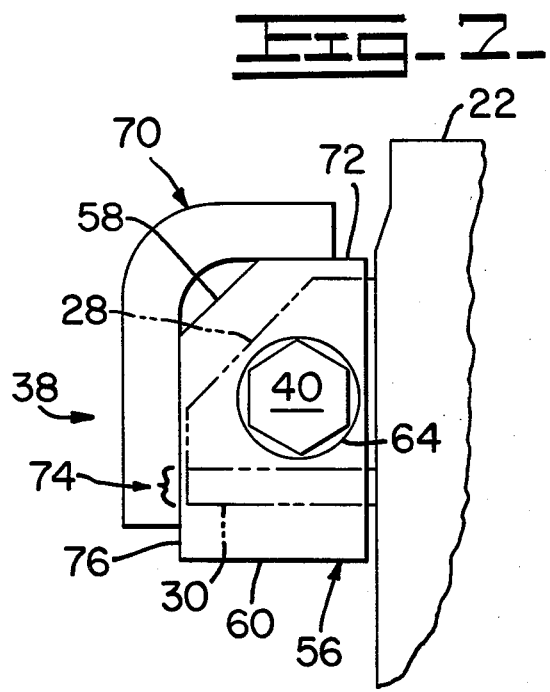
FIG. 7 is an end view illustrating the wear strip and retainer of this invention taken along line VI—VI of FIG. 6.
Figure 4:
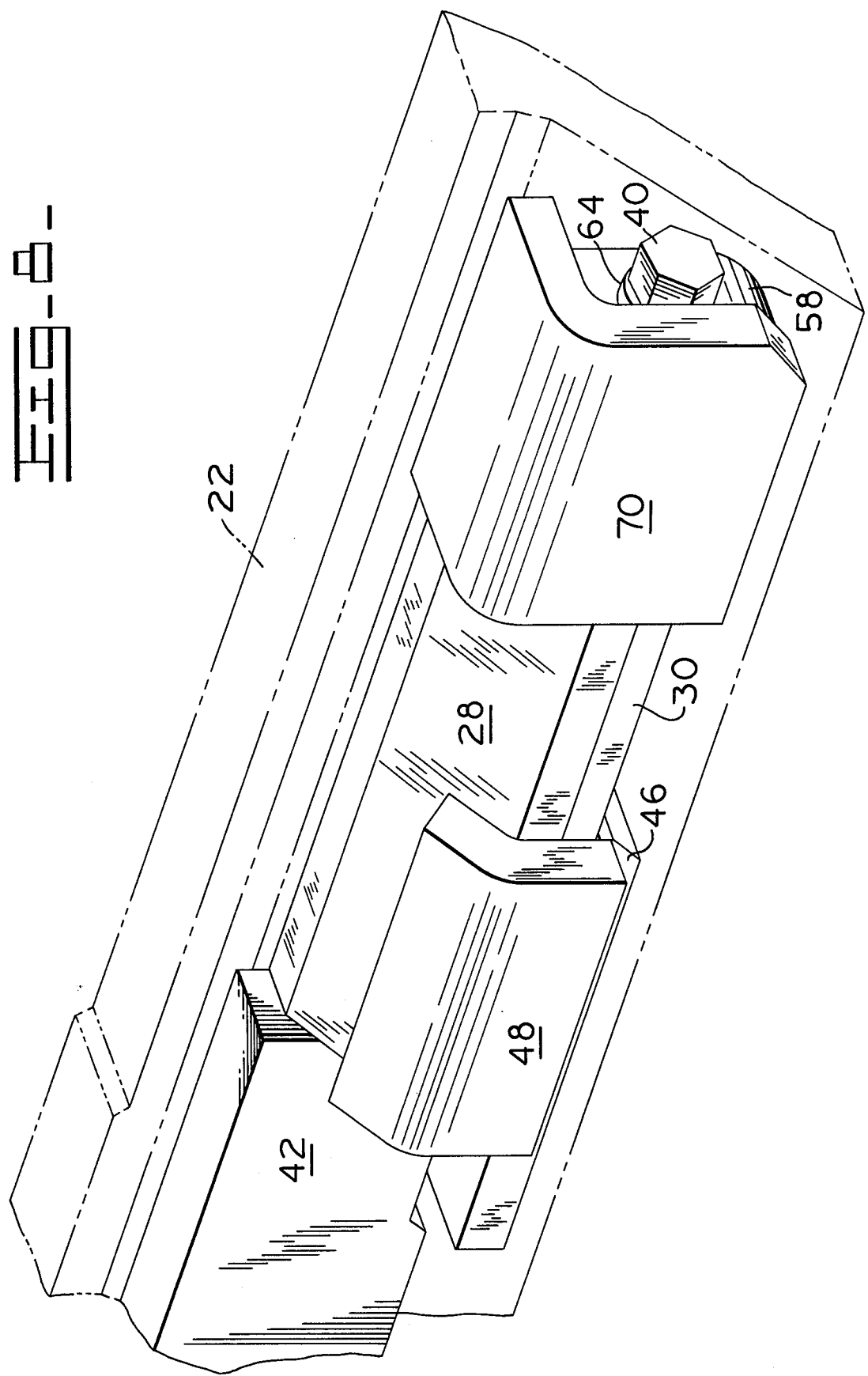

Second retainer 38, FIGS. 6 and 7, includes a wear strip retainer portion 56 generally "L" shaped and preferably formed of steel having a wear strip stop portion 58 formed with a wear strip bottom retainer portion 60. Thus, stop portion 58 can abut second end 62 of wear strip support 28 and bottom portion 60 extends therefrom a preselected distance substantially parallel with support 28 to retain wear strip 30. Bolt 40 passes through washer 64, bore 66 in stop portion 58 and into threaded bore 68 formed in second end 62 of support 28. Also, retainer 38 includes side retainer 70 preferably of steel, also "L" shaped and welded to top surface 72 and to side surface 76 of strip retainer 56. Thus, second retainer 38 comprises a retainer cap formed of two "L" shaped portions 56,70, welded together as a unit which may be bolted to the wear strip support portions 28 of frame 22. Retainer or cap 38 forms a receptacle at slot 74 with frame 22 for releasably engaging and retaining second end 78 of wear strip 30 due to releasable bolt 40 in threaded bore 68.

In operation, with first retainer 36 welded to frame 22, and second retainer 38 removed, first end 52 of wear strip 30 is inserted into slot 50 in abutment with stop 42. Retainer 38 is then mounted at second end 62 of support 28 so that second end 78 of wear strip 30 is in slot 74 and stop portion 58 abuts second end 62 of support 28. Bolt 40 is then threaded into bore 68 and wear strip 30 is releasably retained in position relative to idler 20. When required, bolt 40 and second retainer 38 can be removed for replacement of wear strip 30.

The foregoing has described an idler wear strip retainer for track-type vehicles which is releasably retained on the roller frame for quick replacement of an idler wear strip.

The embodiments of the invention in which an exclusive property or privilege is claimed are defined as follows:

1. An idler wear strip retainer for track-type vehicles comprising:

first and second retainer means secured to a frame portion of an associated vehicle for forming receptacles therewith and for engaging and retaining first and second ends, respectively, of the wear strip; and at least one of the retainer means is releasably secured to the frame portion.

2. The retainer of claim 1 wherein the first retainer means is welded to the frame adjacent the first end of the wear strip and the second retainer means is bolted to the frame adjacent the second end of the wear strip.

* * * * *